No. 882,053. PATENTED MAR. 17, 1908.
A. CONKLE.
DRAG SCRAPER.
APPLICATION FILED NOV. 7, 1907.
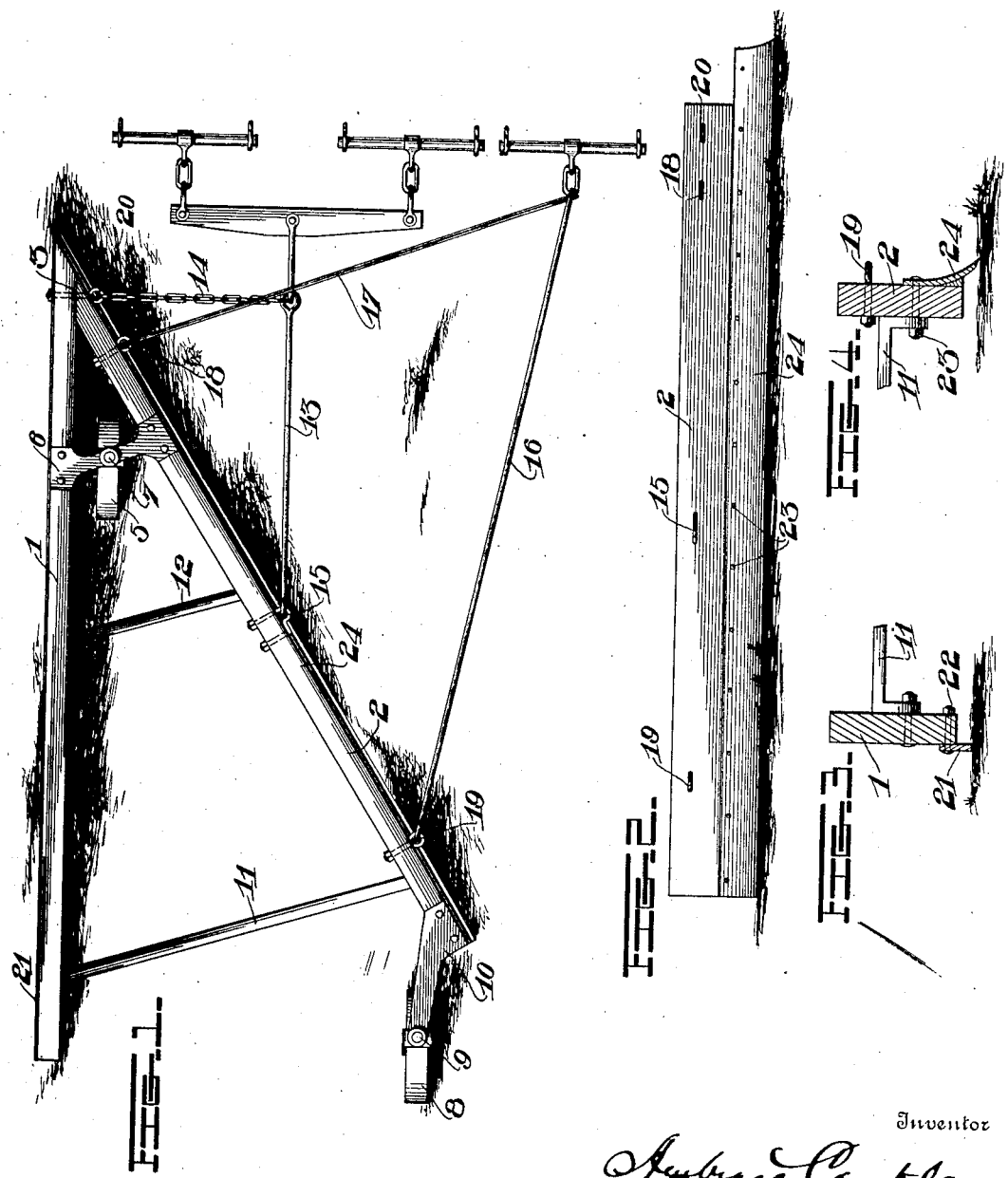

UNITED STATES PATENT OFFICE.

AMBROSE CONKLE, OF LURAY, MISSOURI.

DRAG-SCRAPER.

No. 882,053.        Specification of Letters Patent.        Patented March 17, 1908.

Application filed November 7, 1907. Serial No. 401,077.

*To all whom it may concern:*

Be it known that I, AMBROSE CONKLE, a citizen of the United States, residing at Luray, in the county of Clark and State of Missouri, have invented certain new and useful Improvements in Drag-Scrapers, of which the following is a specification.

My invention relates to an improvement in drag scrapers for grading and smoothing roads.

The object of the invention is to provide a simple machine which will be comparatively light yet effectual in the performance of its functions.

With these objects in view, my invention consists in certain novel features of construction and combination of parts which will be hereinafter described and pointed out in the claims.

In the accompanying drawings, Figure 1 is a plan view; Fig. 2 is a side elevation of the mold board, and Figs. 3 and 4 are details.

The scraper comprises in the main the land side 1, and mold board 2, the two preferably being made of straight timbers securely bolted together at 3 and in the shape of the letter V and braced apart by means of braces 11 and 12 at intervals. The land side 1 may be provided with a metal strip 21, to afford a sharp runner as shown in Fig. 3, which runner 21 is bolted in place by means of the bolt 22, 22. The mold board 2 is provided with a curved metal cutting blade 24 held thereon by bolts 23, 23 as shown in Figs. 2 and 4. This cutting blade corresponds to the mold board of a plow and performs the active work of grading and smoothing the road.

A forward caster wheel 5 is provided with a shank 7, by which it is pivotally supported in the frame 6, and the rear wheel 8 is provided with a shank 9 pivotally supported in the frame 10.

It is the design of my invention that the drag scraper should be pulled along so that the land side member 1 should travel in a straight course as nearly as possible, whereas the mold board member 2 does the active work of scraping and smoothing, and to accomplish this, means is provided for applying the draft in such a way that this end is accomplished. Such a draft mechanism I have shown in Fig. 1 in my drawings as an exemplification of a form of mechanism for accomplishing the purpose. Draft rods 13 and 16 extend from the eye bolts on hooks 15 and 19 respectively in a forward direction more or less parallel with the line of draft. A rigid rod 17 extends from the eye bolt 18 to the forward end of rod 16 and a chain 14 from the eye bolt 20 to the forward end of rod 13, and to these the whiffle-trees or swingle trees are attached. In this way the draft is longitudinal, and the mold board member 2 has the desired effect of scraping the loose and rough portions lying on the surface of the road to one side.

The chain 14 allows flexibility and permits the draft animals more or less freedom of side movement, whereas the rod 17 did not permit such movement. The two means illustrate different possible constructions for accomplishing about the same purpose.

The drag scraper might be provided with a floor if desired (not shown), and also with a seat (not shown) for the driver to occupy if more weight is required. These are perfectly obvious accessories.

From the foregoing it will be seen that a successful grading and smoothing machine is provided at very small expense, that is, compared with the road graders of ordinary use, which are very heavy and expensive machines.

More or less slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. A drag scraper comprising a land side member and a mold board member rigidly secured together at an angle to each other, wheels for supporting said members at or near the front and rear ends, rods extending forwardly from different points on one of the members, to the forward ends of which draft attachments are secured, and means extending across from the forward ends of each of said rods to the scraper.

2. A drag scraper comprising land side member, and a mold board member rigidly secured together at an angle to each other, wheels for supporting said members at or near the front and rear ends, rods extending forwardly from different points on one of the members, to the forward ends of which the draft attachments are secured, a rod extending from the forward end of one of the said rods to the mold board member, and a chain extending from the forward end of the other rod to the mold board member.

In testimony whereof I affix my signature in presence of two witnesses.

AMBROSE CONKLE.

Witnesses:
M. C. SISSON,
J. A. PORTER.